Sept. 17, 1957  G. T. BUCKLEY, JR  2,806,576
CARBON HOLDING APPARATUS
Filed Jan. 11, 1954  5 Sheets-Sheet 1

INVENTOR.
Garfield T. Buckley Jr.
BY
ATTORNEYS

Sept. 17, 1957 G. T. BUCKLEY, JR 2,806,576
CARBON HOLDING APPARATUS
Filed Jan. 11, 1954 5 Sheets-Sheet 2

INVENTOR.
Garfield T. Buckley Jr.
BY
ATTORNEYS

Sept. 17, 1957

G. T. BUCKLEY, JR 2,806,576

CARBON HOLDING APPARATUS

Filed Jan. 11, 1954

INVENTOR.
Garfield T. Buckley Jr.
BY
ATTORNEYS

United States Patent Office 2,806,576
Patented Sept. 17, 1957

2,806,576

CARBON HOLDING APPARATUS

Garfield T. Buckley, Jr., Newark, N. J., assignor to Old Town Corporation, Brooklyn, N. Y., a corporation of New York Application January 11, 1954, Serial No. 403,204

25 Claims. (Cl. 197—126)

This invention relates generally to improvements in carbon holding apparatus and, more particularly, to improvements in carbon holding apparatus adapted for use with continuous form stationery.

One object of the present invention is the provision of improved carbon holding apparatus adapted for use with continuous form stationery in which the carbon holding apparatus is provided with one or more carbon holding devices which are adapted to support a continuous supply of transfer material in interleaved relation with the continuous form stationery.

Another object of the present invention is the provision, in carbon holding apparatus of the aforenoted character, of improved carbon holding devices which are supportable by said apparatus in cantilever fashion and which are readily and facilely movable into and out of operative engagement with continuous form stationery whereby said devices may be readily and facilely replenished with a fresh carbon supply.

Another object of the present invention is the provision, in carbon holding apparatus of the aforenoted character, of improved means for mounting one or more carbon holding devices in cantilever fashion on said apparatus.

Another object of the present invention is the provision of improved carbon holding devices which are supportable on carbon holding apparatus of the aforenoted character, said devices being adapted to support a continuous supply of transfer material in interleaved relation with continuous form stationery.

Another object of the present invention is the provision of improved flat pack arrangements of a continuous supply of transfer material which are adapted for association with carbon holding devices of the aforenoted character, said flat pack arrangements being adapted to be supported by carbon holding devices between webs of continuous form stationery.

Another object of the present invention is the provision of generally improved carbon holding apparatus which is simple in design and construction, economical to manufacture, and highly efficient in the accomplishment of its intended purposes.

The above and other objects, features and advantages of the present invention will be more fully understood from the following description considered in connection with the accompanying illustrative drawings.

In the drawings which illustrate the best modes now contemplated by me for carrying out my invention.

Figures 1, 2:
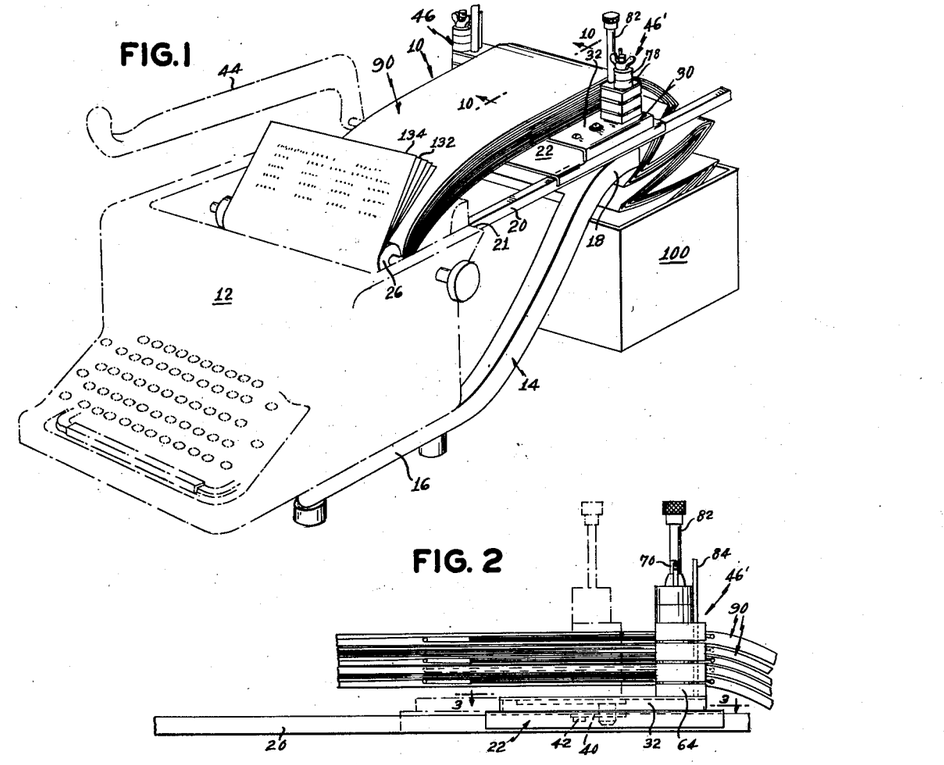
Fig. 1 is a perspective view of carbon holding apparatus formed according to the present invention shown attached to a typewriter and in operative association with continuous form stationery.
Fig. 2 is a side elevational view of the carbon holding apparatus showing carbon sheet material interleaved with webs of continuous form stationery.
Figure 4:
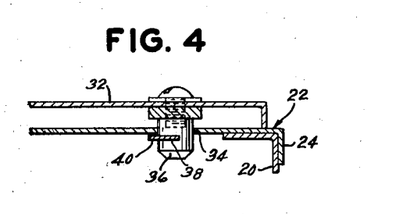
Fig. 4 is a sectional view taken on the line 4—4 of Fig. 3.

Referring to the drawings, and more particularly to Fig. 1 thereof, there is shown carbon holding apparatus 10 which constitutes an attachment for a conventional typewriter 12 or other writing instrument. The carbon holding apparatus 10 comprises a pair of laterally spaced support arms 14, the forward part 16 of said arms being adapted to support typewriter 12 in the manner illustrated in Fig. 1. The arms 14 at the rear part 18 thereof have mounted thereon laterally spaced members 20 which constitute tracks for the carriage 22 slideably mounted thereon. The forward end 21 of the tracks 20 may be attached or integrated with the typewriter 12 in any desired manner whereby to provide a rigid support for said tracks. As best shown in Fig. 4, the tracks 20 are in the form of angle members and the carriage 22 is provided at opposite ends thereof with a depending flange 24, said flanges being adapted to coact with tracks 20 for guiding the movement of the carriage 22 towards and away from the platen 26 of the typewriter 12. It will be understood that any suitable support arrangement may be utilized for supporting and guiding the movement of the carriage 22 as aforedescribed. The carriage 22 is adapted to have detachably secured thereto the carbon holder 30, said carbon holder having a base 32 which is detachably secured to the carriage 22 in the manner now to be described.

The carriage 22 is provided with a pair of apertures 34 at opposite ends thereof which are adapted to register with the projecting pins 36 which are secured to the base 32 in any desired manner. It is to be noted that the carbon holder 30 and the base 32 thereof are substantially symmetrical with respect to the lateral axis thereof whereby it will be apparent that both ends of the base 32 are structurally similar. Accordingly, each end of base 32 is provided with a projecting pin 36 which is adapted to extend through the registering apertures 34 of the carriage 22. Each projecting pin 36 is provided with a transverse slot 38 which is adapted for the reception of a companion locking lever 40 which is pivotally mounted on the carriage 22 by means of a pivot pin 42. From the above it will be apparent, that the locking levers 40, which are pivotally mounted on the carriage 22, are adapted to be interengaged with the slots 38 of the pins 36 for releasably securing the base 32 to carriage 22. It will also be evident from the above that the locking levers 40 may be readily retracted from the slots 38 whereby the base 32 and the structure carried thereby may be readily detached from the carriage 22. When the base 32 is connected to the carriage 22 in the aforedescribed manner said base and carriage are movable in unison along the tracks 20 to and from the platen 26 of typewriter 12. In order to facilitate the movement of the carriage 22 and the structure supported thereby there is provided a forwardly extending arm 44 which is fixed to the carriage 22 in any desirable manner and which is arranged for ready accessibility to the typist.

The base 32 is provided with aligned spaced support provisions 46 for holding one or more carbon holding devices 48, the latter having means for supporting a continuous supply of transfer material in the manner to be described in detail hereinafter. The carbon holding device 48 is in the form of a frame of any suitable design and construction and one or more of said frames is adapted to be supported by the provisions 46 in cantilever fashion. Accordingly, each carbon holding frame 48 is adapted to be supported at one end by a provision 46 and said frames are adapted to be supported in vertically spaced stacked relation in the manner which will be apparent from the description which follows. The frames 48 supported by the provision 46 are adapted to be disposed in intervening alternate relation with the frames 48 supported by the provision 46' as is well known to those skilled in the art. Accordingly, the provisions 46 are structurally similar except that one of the provisions 46 is adapted to support its associated frames 48 in intervening alternate relation with the frames 48 of the other provision 46'.

Figure 5:
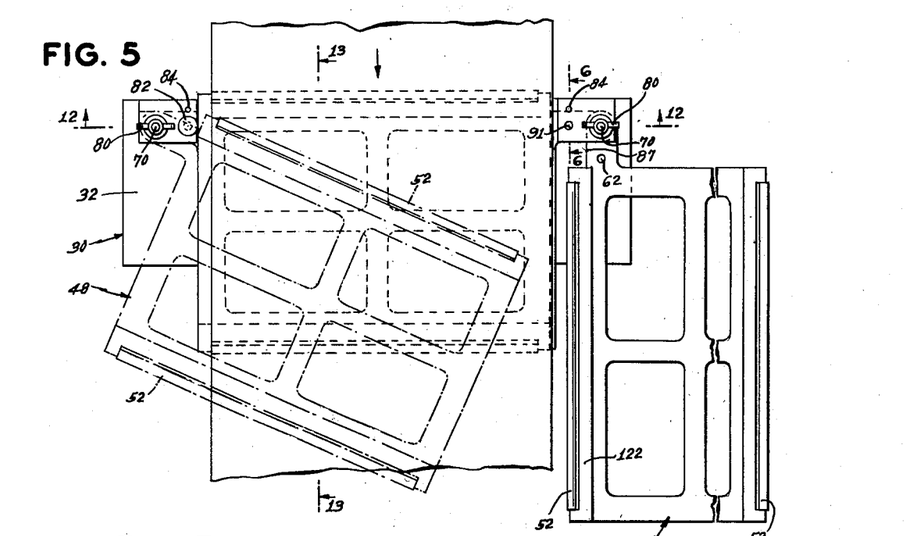
Fig. 5 is a top plan view of the carbon holding apparatus with the carbon holder frames thereof shown in various dispositions.
Figure 6:
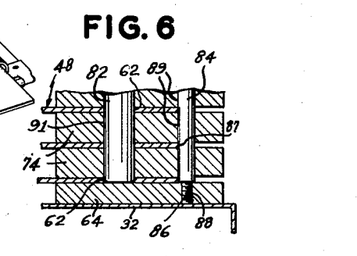
Fig. 6 is a sectional view, on an enlarged scale, taken on the line 6—6 of Fig. 5.
Figure 7:
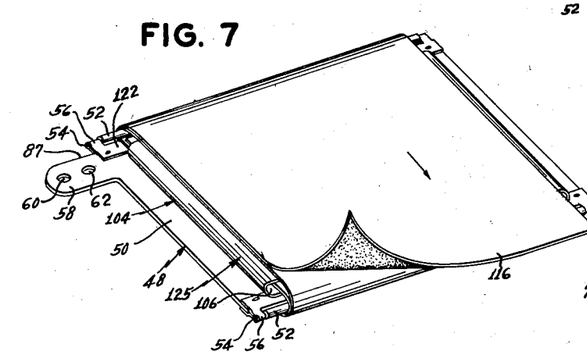
Fig. 7 is a perspective view of a carbon holding frame having a continuous supply of transfer material associated therewith.

With reference to Figs. 5–7, the carbon holding frame 48 comprises a generally flat material supporting body part 50, there being disposed at opposite sides of said body part a pair of laterally spaced rollers 52 which have their axes extending transversely of the continuous form stationery operatively associated with the carbon holding apparatus 10. Frame 48 is preferably constructed so as to be relatively thin whereby to minimize the bulk thereof for the purpose which will be evident from the description which follows. Each end of the rollers 52 is provided with a projecting shaft portion 54 which is journalled for rotation in suitable brackets 56 formed in any suitable manner. Thus the rollers 52 are rotatably mounted in aligned pairs of brackets 56 which are formed in any suitable manner and which are integrated with the body part 50 in any conventional manner. Each of the frames 48, at the rear part of one end thereof, is provided with a projecting portion 58, said projecting portion being apertured therethrough at spaced points as indicated at 60 and 62. The apertured projecting portion 58 of frame 48 is adapted to be associated with one of the provisions 46 for mounting said frame in cantilever fashion on holder 30.

Figure 3:
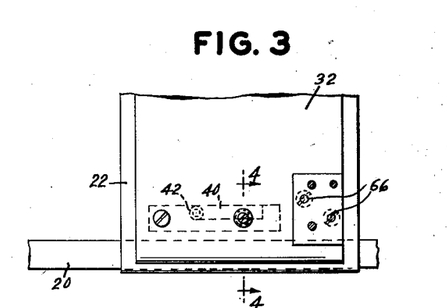
Fig. 3 is a sectional view taken on the line 3—3 of Fig. 2.
Figure 12:
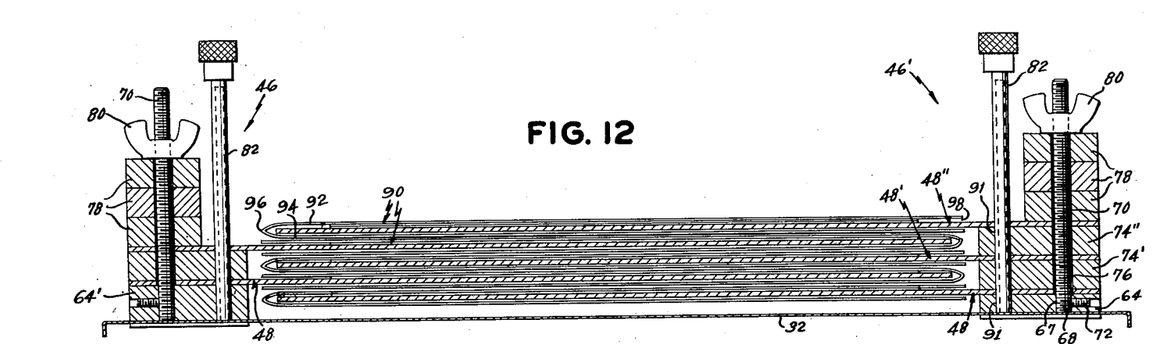
Fig. 12 is a sectional view, on an enlarged scale, taken on the line 12—12 of Fig. 5.

Each of the supports or support provisions 46 comprises a bottom spacer member 64 which is secured to the base 32 in any desired manner as by means of the screws 66 (Fig. 3). It is to be noted that the bottom spacer members 64 for the support provisions 46 and 46' are similar except that said spacer members 64 are of different thicknesses whereby to support the frames 48 in the aforenoted intervening alternate relation. Accordingly, the spacer members 64 for the support provisions 46 and 46' will be of different thicknesses whereby the lowermost carbon holding frames 48 supported by said provisions will be supported in vertically spaced stacked relation. As best shown in Fig. 12, each spacer member 64 is provided with a socket 67 which is adapted for the reception of the end portion 68 of a post 70, the latter constituting the pivot axis for the pivotal movement of the carbon holding frames 48 when he latter are assembled to a post. The upwardly extending post 70 may be secured in the socket 67 in any desired manner and in the illustrated embodiment there is provided a clamping screw 72 which is adapted to releasably secure said post in the socket 67 of a companion member 64. Spacer members 74 are adapted to be detachably mounted on the post 70 in stacked relation with member 64 and for this purpose said members are apertured therethrough as indicated at 76. Thus the post 70 is adapted to extend through the apertures 76 of the members 74 for the mounting of the latter on said post, it being noted that said spacer members are of uniform thickness and that the projecting portions 58 of frames 48 are adapted to be mounted on the post 70 between an associated pair of spacer members. Thus, as shown in Fig. 12, the lowermost frame 48 is mounted on the post 70 between the spacer members 64 and 74' with the frame 48', next lowermost, being mounted between a pair of spacer members 74' and 74". The uppermost carbon holding frame 48" is disposed between a spacer member 74" and a spacer ring 78, it being noted that there is provided a plurality of spacer rings 78 between the uppermost frame 48" and the wing nut 80 which is threaded complementary to the post 70. Any number of frames 48 may be supported on post 70 up to the capacity of the latter and one or more spacer rings 78 may be removed from post 70 to accommodate additional frames 48. The wing nut 80 is adapted to interclamp the frames 48 and the spacer devices 64, 74 and 78 for the firm support of the frames 48 on the base 32 in cantilever fashion. Accordingly, the threaded engagement of the wing nut 80 on post 70 provides for the clamping of the frames 48 and the spacer devices aforedescribed in unitary relation whereby each of the frames 48 will be supported in a firm and rigid manner on post 70 in cantilever fashion. Thus, when one or more frames 48 is assembled on post 70 as aforedescribed said frames will be disposed in firm clamping engagement between an associated pair of spacer devices. It is to be noted that the apertures 60 of the projecting portions 58 of the frames 48 are adapted to be received on the upright post 70 and that accordingly said projecting portions of said frames will be firmly clamped between an associated pair of spacer devices in the aforedescribed manner to effect the support of frames 48. One or more frames 48 may be readily removed from the post 70 by the disengagement of the wing nut 80 from post 70 and the removal of the requisite number of frames and spacer devices from said post. As aforenoted, each of the support provisions 46 and 46' is similar in all respects except that the bottom spacer member 64 of provision 46' is thinner than the bottom spacer member 64' of provision 46, whereby to provide for the vertical spacing between adjacent frames 48 carried by the support provisions 46 and 46'. Thus, each of the frames 48 supported on a post 70 is pivotally movable about the axis of said post into and out of operative engagement with continuous form stationery 90 led between the support provisions 46 and 46' as will be subsequently described in detail.

In order to maintain the projecting portions 58 of the frames 48 in vertically aligned condition independent of the nut 80, there is provided a pin member 82 which is adapted to extend through the vertically aligned apertures 62 and 91 of said projecting portions and the spacer members 74, respectively. Accordingly, when the projecting portions 58 and the spacer members 64 and 74 are in vertically aligned condition the pin member 82 may be inserted through aligned apertures 62 and 91 to maintain said vertical alignment. It is to be noted that the bottom spacer members 64 are in fixed relation with the base 32 and accordingly the spacer members 74 and the projecting portions 58 are adapted to be aligned with said bottom spacer members. Pin member 82 is dimensioned for ready removability from the spacer members 74 and the projecting portions 58 whereby on the removal of said pin member and on the sufficient loosening of the wing nut 80 the frames 48 are individually pivotally movable into and out of operative engagement with the continuous form stationery 90 fed between the pin members 82. In order to limit the pivotal movement of the frames 48 in a counter-clockwise direction, viewing Fig. 5, or in the direction of operative engagement with the continuous form stationery 90 there is provided abutment means which is here constituted by a stop pin 84, the latter having a threaded end portion 86 which is adapted to be threadedly engaged in the aperture 88 of the bottom spacer member 64 (Fig. 6). The spacer members 74 are provided with aligned apertures 89 which are adapted for the reception of the upwardly extending stop pin 84, it being noted that said stop pin is adapted to coact with the edges 87 of the projecting portions 58 of frames 48 for limiting the pivotal movement of the frames in a counter-clockwise direction, viewing Fig. 5. Accordingly, the stop pin 84 functions to maintain the vertical alignment of the spacer members 74 during the pivotal movement of the frames 48 and said stop pin also serves to limit the pivotal movement of the frames in the direction of operative engagement with the continuous form stationery 90 whereby to provide for the vertical alignment of the projecting portions 58 so that the pin member 82 may be cooperatively associated with the aligned apertures 62 of said projecting portions to maintain the vertical alignment of the stacked series of frames 48. Accordingly one or more frames 48 may be pivotally moved to the various dispositions illustrated in Fig. 5 by removing the pin member 82 and releasing the nut 80, it being noted that the spacer members 74 will be maintained in vertical alignment during said pivotal movement by means of the stop pin 84 aforedescribed.

The carbon holder 30 is adapted to be used in connection with the typing of continuous forms which may be supplied either in strip style or in fan-fold style, it being understood that the continuous form stationery adapted for use with holder 30 is conventional in all respects. In the illustrated embodiment the continuous form stationery 90 is in fan-fold form and comprises a series of individual forms which are connected to each other along transverse perforated lines whereby the individual forms may be readily severed from the continuous length of forms 90. As clearly shown in Figs. 1 and 12, the continuous form stationery 90 comprises a series of sheets or webs 92 and 94 which are connected at one edge as indicated at 96 and which are open at their opposite edges as indicated at 98. Accordingly, adjacent webs 92 and 94 are interconnected at one edge and are open at opposite edges, a carbon holder frame 48 being adapted to be received between each companion pair of webs 92 and 94 through the opening 98 defined by the open edges of the webs. As aforenoted, in the illustrated embodiment continuous form stationery 90 is of fan-fold style and accordingly the connected edges 96 of adjacent companion pairs of webs 92 and 94 will alternate at opposite sides of the continuous form stationery 90, as will be readily apparent to those skilled in the art. A frame 48 is adapted to be disposed between each connected pair of webs 92 and 94, it being noted that adjacent pairs of webs 92 and 94 are adapted to receive therebetween frames 48 carried by the support provisions 46 and 46' in alternating fashion. As will be subsequently described in detail, each of the frames 48 is adapted to support a continuous supply of carbon sheet material in interleaved relation with the continuous form stationery 90 and each of the frames 48, which is supportable on one of the provisions 46 and 46' in cantilever fashion, is pivotally movable into and out of operative engagement with the webs 92 and 94 of the continuous form stationery 90 which is led between the supports 46 and 46'. As shown in Fig. 1, the continuous form stationery 90 which is disposed in fan-fold fashion is supplied from any suitable receptacle 100 which is disposed in a convenient position relative to the carbon holder 30 whereby to supply the latter with such continuous form stationery. Thus the carbon holder 30 is adapted to be used in the production of a plurality of carbon copies by means of carbon sheets interleaved with the webs 92 and 94 of the continuous form stationery 90 and the latter is adapted to be associated with the platen 26 of typewriter 12 in the well known conventional manner. The manner of associating a continuous supply of transfer material or carbon sheet material with the frames 48 will now be described in detail.

Figure 8:
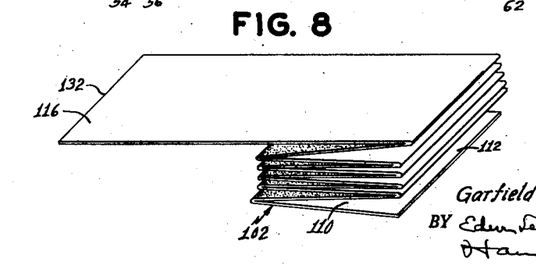
Fig. 8 is a perspective view of a continuous supply of transfer material in an intermediate stage of formation.
Figures 9, 10, 11:
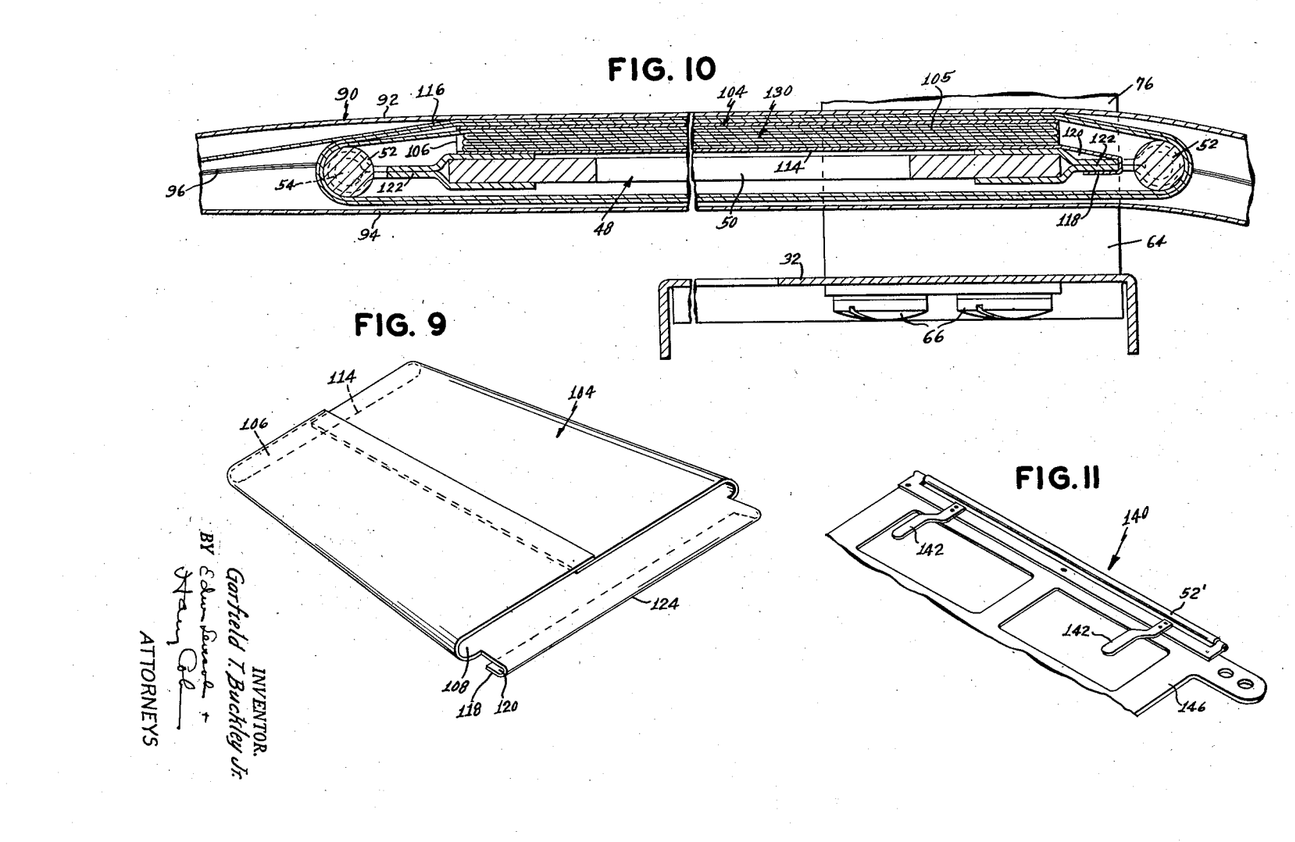
Fig. 9 is a perspective view of the envelope or enclosing means for the continuous supply of transfer material illustrated in Fig. 8.
Fig. 10 is a sectional view, on an enlarged scale, taken on the line 10—10 of Fig. 1.
Fig. 11 is a fragmentary perspective view of a modified form of carbon holding frame.

With reference to Figs. 7, 8 and 9, the continuous supply of carbon sheet material 102 is disposed in fan-fold fashion and is adapted to be carried in an enclosure means or envelope 104 which is open at its opposite ends as indicated at 106 and 108. One end portion of the continuous supply of carbon sheet material 102 is preferably uncarboned as indicated at 110 and the marginal portion 112 of the uncarboned strip 110 is secured to the bottom wall 114 of envelope 104 in any conventional manner, for example by the use of a suitable adhesive. Thus the continuous supply of carbon sheet material 102 is adapted to be contained in the envelope or enclosure means 104 to thereby define flat pack 125, and one end portion 112 of said continuous supply is secured to the bottom wall 114 of said envelope interiorly of the latter. It is to be noted that the envelope 104, which may be formed of any suitable material, is dimensioned so as to be substantially coextensive with the stacked sheets 105 of carbon material which is fan-folded in the aforedescribed manner. Thus the entire continuous supply of carbon sheet material 102 is adapted to be carried in the envelope 104 whereby the latter in combination with the continuous supply of carbon sheet material constitutes a manifolding flat pack 125 of carbon sheet material which is adapted for association with a companion carbon holding frame 48. The bottom wall 114 of the envelope 104 is provided with a flap portion 118 which is folded back of the bottom wall 114 whereby there is defined between the bottom wall and the flap portion 118 a longitudinally extending pocket 120 which is adapted to receive the part 122 of the frame 48. Accordingly envelope 104 is adapted to be releasably secured to a companion frame 48 by the releasable securement of the flap portion 118 with the part 122 of said frame. The securement of the flap portion 118 to the part 122 may be effected in any desired manner, for example by means of conventional fastener elements or by the use of adhesive means. Accordingly the rear end 124 of the envelope 104 is adapted to be releasably secured to the frame 48 and the free or leading end portion 116 of the carbon supply 102 is adapted to be drawn from the envelope 104 through the forward open end 106 thereof. The envelope 104 is adapted to be positioned on, and carried by, the body part 50 of frame 48 between the laterally spaced rollers 52 and the free or leading end portion 116 of the carbon supply 102 is adapted to extend through the open end 106 of the envelope 104 and be wound around said rollers with the envelope 104 being disposed between such wound portions and the body part 50 of the carbon holder frame 48. In practice, the envelope 104 of pack 125 containing the carbon supply will be releasably secured to the frame 48 in the aforedescribed manner and the leading end portion 116 of the carbon supply will be drawn through the open end 106 of the envelope 104 and into operative engagement with the rollers 52 as shown in Fig. 10, said leading end portion being preferably wound around said rollers a plural number of times. Accordingly, when the manifolding flat carbon pack 125 is in assembled relation with the frame 48, the leading end portion 116 of the continuous carbon supply 102 will be operatively associated with the rollers 52 and is adapted to be drawn therefrom which will effectuate the advance of part of the reserve portion 130 of the continuous carbon supply 102 through the open end 106 of envelope 104 into operative association with said rollers. From the above it will be apparent that the continuous supply of carbon sheet material 102 when operatively associated with a frame 48 will comprise a main reserve portion 130 which is disposed in envelope 104 in fan-fold fashion and a leading end portion 116 which is wound around the rollers 52 in operative association therewith. Thus as the leading end portion 116 of carbon supply 102 is drawn from the rollers 52 into association with stationery 90 the main reserve portion 130 of the continuous carbon supply will advance through the open end 106 of envelope 104 into operative association with said rollers, as aforedescribed. The manifolding flat pack of carbon sheet material 125 is adapted to be carried by the body part 50 of each of the frames 48 supported by the support provisions 46 and 46' with the leading end portions 116 of each of said flat packs being operatively associated with the rollers 52 whereby carbon sheet material which is operatively associated with the stationery 90 is in effect drawn or unreeled from the rollers 52. Thus the continuous supply of carbon material 102 carried by each of the frames 48 is adapted to be unreeled from rollers 52 into operative association with the webs 92 and 94 of the continuous form stationery 90. Each carbon holding frame 48 will be loaded with a continuous supply of carbon sheet material in the aforedescribed manner and will be positioned between a companion interconnected pair of webs 92 and 94. Each frame 48, loaded with carbon sheet material in the aforedescribed manner, will be connected to an associated support provision 46 or 46' in the aforedescribed manner with the webs 92 and 94 in an opened or separated condition. Thus as shown in Fig. 12, the lowermost frame 48 will be positioned between its associated pair of webs 92 and 94 with the latter in an opened condition and thereafter said associated pair of webs will be closed to the condition illustrated in Fig. 12. Thereafter the lowermost carbon frame 48 of the opposite support provision 46 will be associated with its associated pair of webs 92 and 94 in a similar manner until there is provided a carbon loaded frame 48 between each pair of webs of the continuous form stationery 90. After the loaded carbon holding frames 48 are in assembled condition with the continuous form stationery 90 as aforedescribed, the leading end portions 116 of the continuous supplies of carbon sheet material 102 will be unreeled from the rollers 52 so that the leading edges 132 of the carbon sheet material will align with the forward or leading edges 134 of the continuous form stationery 90. Thus the leading end portions 116 of each continuous supply of carbon sheet material associated with each of the frames 48 will be unreeled in the aforedescribed manner so as to align the leading edges 132 thereof with the leading edges 134 of the continuous form stationery 90. After each individual form is completed in the conventional manner the carbon sheet material disposed between the webs 92 and 94 of the completed form is adapted to be retracted from said form so that the latter may be severed from the continuous form stationery 90. Thus the carbon sheet material is adapted to be retracted from the prepared form prior to the severance thereof so that said carbon sheet material may be reused to prepare the next form of the continuous form stationery 90. The carriage 22 will be in a forwardmost position on tracks 20 while a form is being typed and after the completion of such form, platen 26 will be released and the carriage 22 will be slidably moved away from the platen 26 so as to retract the carbon sheet material from the finished form. It will be readily apparent that when an end strip of the carbon supply is no longer serviceable such a strip may be readily severed from the carbon supply and a fresh strip advanced from the rollers 52. Accordingly, the leading end portion of the supply of carbon sheet material for each of the frames 48 may be readily replenished by severing the unserviceable portion of the carbon strip from the carbon supply and advancing a fresh strip portion into operative association with the form of the stationery 90 that is to be prepared. As aforedescribed in detail, the mounting of each of the carbon holder frames 48 is such as to provide for the ready and facile replenishment of the carbon supply associated with the frames. Each of the frames 48 is individually pivotally movable out of operative association with the continuous form stationery 90 whereby to provide for the replenishment of each of the frames 48 with a fresh carbon supply in the manner previously described in detail. Thus each frame 48 is pivotally movable out of stacked relation with the remainder of the frames whereby each of said frames may have a fresh carbon supply associated therewith readily and quickly without disturbing the remaining frames supported on provisions 46 and the stationery 90 led between such provisions. From the above it will be apparent that each carbon holder frame 48, when operatively associated with the continuous form stationery 90, supports and has operatively associated therewith a continuous supply of carbon sheet material or transfer material 102 which is interleaved with the webs 92 and 94 of said continuous form stationery.

Figure 13:
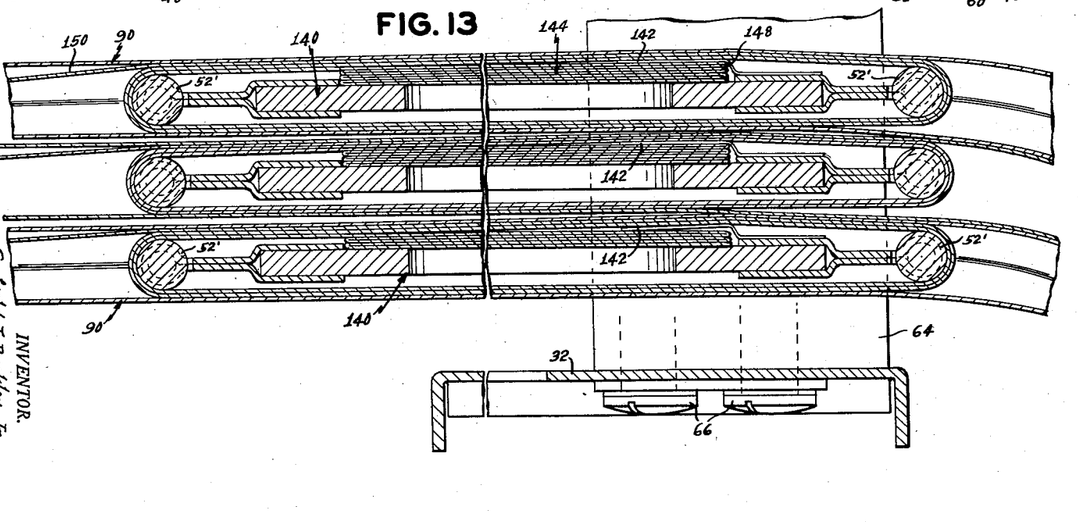
Fig. 13 is a sectional view, on an enlarged scale, taken on the line 13—13 of Fig. 5.

With reference to Figs. 11–13, there is shown a slightly modified form of carbon holding frame 140 which is adapted to have a continuous supply of carbon sheet material associated therewith in a slightly modified manner. The frame 140 is structurally similar to the frame 48 aforedescribed in detail except that frame 140 is provided with a pair of laterally spaced resilient clips 142 which are positioned at the rear side of said frame. A continuous supply of carbon sheet material 144 is adapted to be supported on the body part 146 of frame 140 in fan-fold fashion between the rollers 52'. The resilient clips 142 are adapted to be cooperatively associated with carbon supply 144 in the manner illustrated in Fig. 13 to releasably maintain said carbon supply in position on the body part 146 of frame 140. Thus the rear folds 148 of the carbon supply 144 are releasably maintained in position by means of the resilient clips 142 which are arranged to exert light pressure on said folds for releasably maintaining the latter in position. The leading end portion 150 of the continuous supply of carbon sheet material 144 is adapted to be drawn from the fan-folded supply carried by the body part 146 into operative engagement with the rollers 52' in the manner aforedescribed with reference to the carbon pack 125. In practice, the continuous supply 144 which is disposed in fan-fold fashion will be loaded on the body part 146 of frame or device 140 and a leading end portion 150 will be drawn from said supply and wound around rollers 52' with preferably a plural number of turns whereby carbon sheet material is effectively drawn from the rollers 52' into operative association with the continuous form stationary 90 as aforedescribed. Thus as the leading end portion 150 of the continuous supply of carbon sheet material 144 is drawn from the rollers 52' a fan-folded portion of said continuous supply will be drawn from between the body part 146 and the clips 142 into operative association with the rollers 52' whereby a continuous supply of carbon sheet material is provided which is effectively drawn or unreeled from said rollers. Accordingly, the arrangement illustrated in Figs. 11–13 is similar in all respects to the arrangement aforedescribed except that the frame 140 is provided with clips 142 and the continuous supply of carbon sheet material 144 is associated with such frame without the utilization of an envelope or enclosure means.

Figure 14:
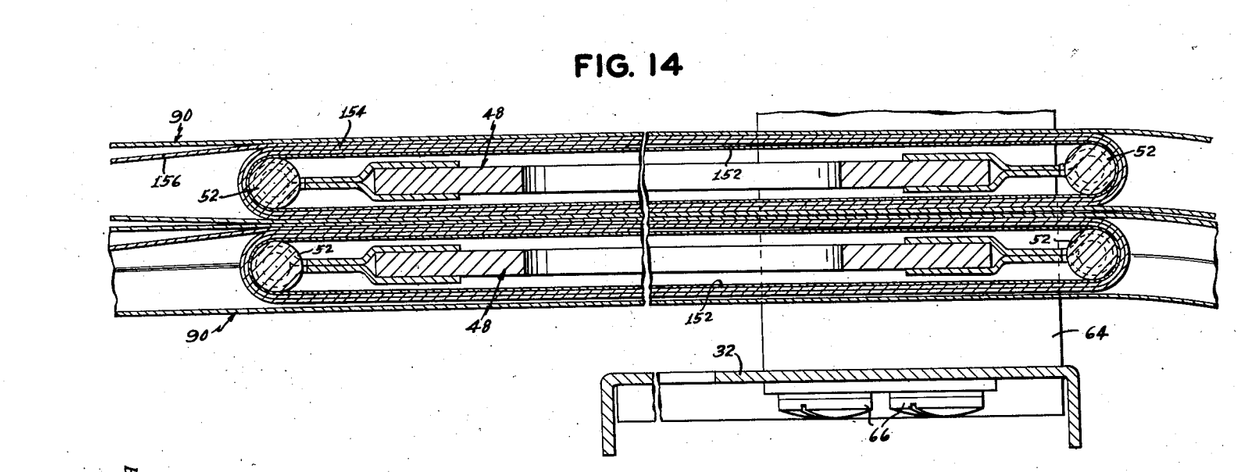
Fig. 14 is a view similar to Fig. 13 showing a modified form of associating a continuous supply of transfer material with carbon holding frames.

With reference to Fig. 14, there is shown a modified arrangement of associating a continuous supply of carbon sheet material with the carbon holding frame 48. Pursuant to this modified arrangement there is provided a flexible flat endless belt 152 which is operatively associated with the rollers 52 for movement in a lineal direction. As aforenoted the rollers 52 are mounted on frame 48 for rotation about the axes thereof and since belt 152 is disposed on said rollers in operative association therewith it will be understood that the movement of the belt 152 will result in the rotation of said rollers. The continuous supply of carbon sheet material 154 is reeled on, or wound around, belt 152 whereby the tensioning of the leading or free end portion 156 of said supply will result in the unreeling of the carbon sheet material supported on carbon frame 48. The carbon supply for the embodiment shown in Fig. 14 will thus be in the form of a manifolding flat pack of carbon sheet material which comprises a flat endless belt 152 which has a continuous supply of carbon sheet material 154 wound thereon, it being noted that said flat pack is adapted to be associated with frame 48 by positioning belt 152 on the rollers 52 of frame 48. The belt 152 carrying the continuous supply of carbon sheet material 154 is adapted to be positioned on the carbon holder frame 48 between webs of continuous form stationery 90 in the manner aforedescribed. Thus the arrangement illustrated in Fig. 14 is similar to the arrangements aforedescribed except that in the arrangement of Fig. 14 the flat pack of carbon sheet material adapted for association with the rollers 52 is in the form of a flat endless belt 152 which has a continuous supply of carbon or transfer material 154 wound thereon.

Figure 15:
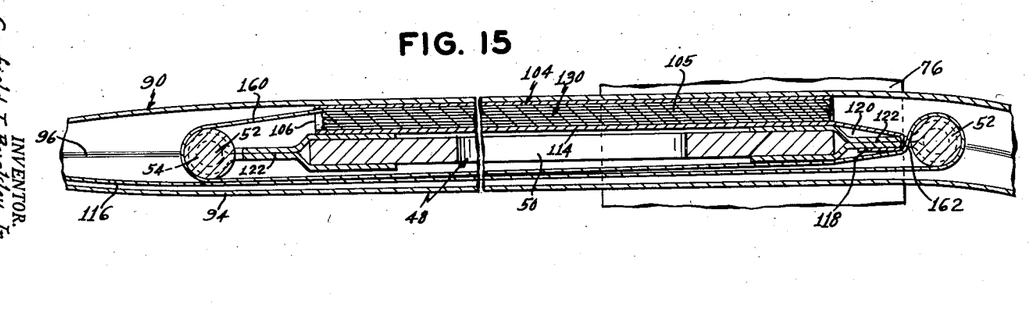
Fig. 15 is a view similar to Fig. 10 showing a modified form of associating a continuous supply of transfer material with carbon holding frames.

With reference to Fig. 15, there is shown a modified arrangement of associating a continuous supply of carbon sheet material with the carbon holding frame 48. Pursuant to this modified arrangement, pack 125 is releasably secured to frame 48 in the manner aforedescribed with reference to Fig. 10, and the leading end portion 160 of the carbon supply is drawn through the open end 106 of envelope 104 and into operative engagement with the rollers 52 as shown in Fig. 15, said leading end portion being wound around the forwardly positioned roller 52 and extended through the space 162, defined between the rearwardly positioned roller 52 and adjacent portions of the body part 50, and wound around said rearwardly positioned roller into operative engagement with webs 92 and 94 of stationery 90. Accordingly the arrangement illustrated in Fig. 15 is similar to the arrangement illustrated in Fig. 10 except that in the former arrangement end portion 160 extends through space 162 into operative engagement with the rearwardly positioned roller 52.

From the above it will therefore be seen that the carbon holding apparatus aforedescribed is adapted for use with continuous form stationery 90, said carbon holding apparatus being provided with one or more carbon holding devices which are adapted to support a continuous supply of transfer material or carbon sheet material in interleaved relation with said continuous form stationery. The carbon holding devices, namely the frames 48 and 140 aforedescribed, are supportable by the carbon holding apparatus in cantilever fashion and are readily and facilely pivotally movable into and out of operative engagement with the continuous form stationery 90 whereby said devices may be readily and facilely replenished with a fresh carbon supply. The various flat carbon pack arrangements aforedescribed having a continuous supply of carbon sheet material are adapted for association with carbon holding devices and are adapted to be supported by said devices between webs of continuous form stationery. The carbon holding devices aforedescribed, having continuous carbon supplies associated therewith, are relatively thin consistent with a large supply of carbon sheet material carried thereby whereby to minimize the bulk disposed between the webs of the continuous form stationery.

While I have shown and described the preferred embodiments of my invention, it will be understood that various changes may be made in the idea or principles of the invention within the scope of the appended claims.

Having thus described my invention, what I claim and desire to secure by Letters Patent, is:

1. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, and means for mounting one or more of said carbon holding frames in cantilever fashion, said mounting means providing for the movability of said frame into and out of operative engagement with said continuous form stationery, said frame means comprising a plurality of laterally spaced rollers from which said continuous supply of transfer material is adapted to be drawn into operative engagement with said stationery between webs thereof.

2. A carbon holder for use with continuous form stationery, comprising a base member having spaced provisions for holding one or more carbon holding devices, and a carbon holding device having means for supporting a continuous supply of transfer material in interleaved relation with continuous form stationery, said device being supportable on one of said provisions in cantilever fashion and being movable into and out of operative engagement with continuous form stationery led between said provisions, said device means comprising a plurality of laterally spaced rollers having their axes extending transversely of said continuous form stationery, said transfer material being adapted to be drawn from said rollers into operative engagement with said stationery.

3. A carbon holder for use with continuous form stationery, comprising a base member having a provision for holding a plurality of carbon holder frames, a plurality of carbon holder frames supportable on said provision in cantilever fashion and in vertically spaced stacked relation, said frames having an apertured projecting portion, said provision including an upwardly extending post having a plurality of apertured spacer members mounted thereon with said post extending through said apertures, said projecting portions being mountable on said post between associated pairs of said members, respectively with said post extending through the apertures of said projecting portions, and a clamping device for interclamping said projecting portions and spacer members, said post having an end portion adapted for the reception of said clamping device, and said frames being pivotally movable about the axis of said post on the release of said clamping device.

4. A carbon holder for use with continuous form stationery, comprising a base member having a provision for holding a plurality of carbon holder frames, a plurality of carbon holder frames supportable on said provision in cantilever fashion and in vertically spaced stacked relation, said frames having an apertured projecting portion, said provision including an upwardly extending post having a plurality of apertured spacer members mounted thereon with said post extending through said apertures, said projecting portions being mountable on said post between associated pairs of said members, respectively with said post extending through the apertures of said projecting portions, and a clamping device for interclamping said projecting portions and spacer members, said post having an end portion adapted for the reception of said clamping device, and said frames being pivotally movable about the axis of said post on the release of said clamping device, and means for maintaining said projecting portions and said spacer members in vertically aligned condition independent of said clamping device.

5. A carbon holder for use with continuous form stationery, comprising a base member having a provision for holding a plurality of carbon holder frames, a plurality of carbon holder frames supportable on said provision in cantilever fashion and in vertically spaced stacked relation, said frames having an apertured projecting portion, said provision including an upwardly extending post having a plurality of apertured spacer members mounted thereon with said post extending through said apertures, said projecting portions being mountable on said post between associated pairs of said members, respectively with said post extending through the apertures of said projecting portions, a clamping device for interclamping said projecting portions and spacer members, said post having an end portion adapted for the reception of said clamping device, and said frames being pivotally movable about the axis of said post on the release of said clamping device, and abutment means for limiting the pivotal movement of said frames in the direction of operative engagement with said stationery, said abutment means providing for the vertical alignment of said frames when the latter are engaged therewith.

6. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, and means for mounting one or more of said carbon holding frames in cantilever fashion, said mounting means providing for the movability of said frame into and out of operative engagement with said continuous form stationery, said frame means comprising a pair of laterally spaced longitudinally extending rollers from which said continuous supply of transfer material is adapted to be drawn into operative engagement with said stationery, said holder frame having a projecting portion constituting a part of said mounting means.

7. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, and means for mounting one or more of said carbon holding frames in cantilever fashion, said mounting means providing for the moveability of said frame into and out of operative engagement with said continuous form stationery, said frame means comprising a plurality of laterally spaced rollers from which said continuous supply of transfer material is adapted to be drawn into operative engagement with said stationery between webs thereof, and a continuous supply of transfer material carried by said holder frame in operative association with said frame rollers.

8. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame in operative association with said frame rollers, the latter having a flat endless belt operatively associated therewith and extending therebetween, said supply of carbon sheet material being carried by said belt and being adapted to be drawn therefrom for interleaving with continuous form stationery.

9. A carbon holder frame having a pair of laterally spaced rollers, the latter having a flat endless belt operatively associated therewith for movement in a lineal direction, and a continuous supply of transfer material wound around said belt and adapted to be drawn therefrom.

10. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, one end portion of said sheet material being wound around said rollers in operative association therewith, said end portion being adapted to be drawn from said rollers for interleaving with continuous form stationery.

11. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, one end portion of said sheet material being wound around said rollers in operative association therewith, said end portion being adapted to be drawn from said rollers for interleaving with continuous form stationery, said continuous supply of carbon sheet material being disposed in fanfold fashion.

12. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, one end portion of said sheet material being wound around said rollers in operative association therewith, said end portion being adapted to be drawn from said rollers for interleaving with continuous form stationery, said continuous supply of carbon sheet material being disposed in fanfold fashion, and means for removably securing the rear portion of said fanfold sheet material to said carbon holder frame.

13. A carbon holder frame having a body part with a pair of laterally spaced rollers at opposite sides thereof, a continuous supply of carbon sheet material having a main reserve portion and a leading end portion, said main reserve portion being carried by said body part between said rollers and said end portion being wound around said rollers in operative association therewith, said end portion being adapted to be drawn from said rollers whereby to advance part of said reserve portion into operative association with said rollers.

14. A carbon holder frame having a body part with a pair of laterally spaced rollers at opposite sides thereof, a continuous supply of carbon sheet material having a main reserve portion and a leading end portion, said main reserve portion being carried by said body part between said rollers and said end portion being wound around said rollers in operative association therewith, said end portion being adapted to be drawn from said rollers whereby to advance part of said reserve portion into operative association with said rollers, said main reserve portion being disposed in fanfold fashion, and means for removably securing the rear part of said fanfolded reserve portion to said body part.

15. A carbon holder frame having a body part with a pair of laterally spaced rollers at opposite sides thereof, a continuous supply of carbon sheet material carried by said body part between said rollers, and enclosure means associated with said body part, said continuous supply being disposed in said enclosure means and having an end portion adapted for operative association with said rollers whereby said end portion is adapted to be drawn therefrom.

16. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, and enclosure means associated with said frame, said continuous supply being disposed in said enclosure means and having an end portion adapted for operative association with said rollers whereby said end portion is adapted to be drawn therefrom.

17. A carbon holder frame having a body part with a pair of laterally spaced rollers at opposite sides thereof, a continuous supply of carbon sheet material carried by said body part between said rollers, and enclosure means associated with said body part, said continuous supply being disposed in said enclosure means and having an end portion adapted for operative association with said rollers whereby said end portion is adapted to be drawn therefrom, said continuous supply being disposed in fanfold fashion.

18. A carbon holder frame having a body part with a pair of laterally spaced rollers at opposite sides thereof, a continuous supply of carbon sheet material having a main reserve portion and a leading end portion, said main reserve portion being carried by said body part between said rollers and said end portion being wound around said rollers in operative association therewith, said end portion being adapted to be drawn from said rollers whereby to advance part of said reserve portion into operative association with said rollers, and enclosure means secured to said frame, said main reserve portion being disposed in fanfold fashion in said enclosure means.

19. A carbon holder frame having a body part with a pair of laterally spaced rollers at opposite sides thereof, a continuous supply of carbon sheet material having a main reserve portion and a leading end portion, said main reserve portion being carried by said body part between said rollers and said end portion being wound around said rollers in operative association therewith, said end portion being adapted to be drawn from said rollers whereby to advance part of said reserve portion into operative association with said rollers, and enclosure means secured to said frame, said main reserve portion being disposed in fanfold fashion in said enclosure means the latter being constituted by an envelope open at one end whereby said main reserve portion may be drawn into operative association with said rollers.

20. A carbon holder frame having a flat material supporting body part with a pair of laterally spaced rollers at opposite sides thereof, a continuous supply of carbon sheet material having a main reserve portion and a leading end portion, and enclosure means for said supply of sheet material having an open end, said main reserve portion being disposed in fanfold fashion in said enclosure means, the opposite end of said enclosure means being secured to said body part, said leading end portion extending through said open end of said enclosure means and being wound around said rollers with said enclosure means being disposed between said leading end portion and said body part, said leading end portion being operatively associated with said rollers and being adapted to be drawn therefrom whereby to advance part of said reserve portion through said open end into operative association with said rollers.

21. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, one end portion of said sheet material being wound around said rollers in operative association therewith, said end portion being adapted to be drawn from said rollers for interleaving with continuous form stationery, said carbon holder frame having a body part and at least one of said rollers being in spaced relation with said body part, said one end portion of sheet material extending through the space between said body part and said one roller in operative association with the latter.

22. In a carbon holder for use in the production of a plurality of carbon copies by means of carbon sheets interleaved with webs of continuous form stationery, a carbon holder frame having means for supporting a continuous supply of carbon sheet material adapted to be interleaved with continuous form stationery, said frame means comprising a pair of laterally spaced rollers, and a continuous supply of carbon sheet material carried by said holder frame between said rollers, one end portion of said sheet material being wound around said rollers in operative association therewith, said end portion being adapted to be drawn from said rollers for interleaving with continuous form stationery, said carbon holder frame having a body part and at least one of said rollers being in spaced relation with said body part, said one end portion of sheet material extending through the space between said body part and said one roller in operative association with the latter, said continuous supply of carbon sheet material being disposed in fanfold fashion.

23. A carbon holder frame having a body part with a pair of laterally spaced rollers at opposite sides thereof, a continuous supply of carbon sheet material carried by said body part between said rollers, and enclosure means associated with said body part, said continuous supply being disposed in said enclosure means and having an end portion adapted for operative association with said rollers whereby said end portion is adapted to be drawn therefrom, one of said rollers being in spaced relation with said body part, said one end portion of sheet material extending through the space between said body part and said one roller in operative association with the latter.

24. A manifolding flat pack of transfer material adapted for association with a carbon holder frame between webs of continuous form stationery, comprising a flat endless belt having a plurality of convolutions of a continuous supply of transfer material wound therearound, said belt defining an opening adapted for the reception of a carbon holder frame for supporting the flat pack between webs of continuous form stationery, said belt and said opening being of coextensive circumferential extent corresponding to the circumferential extent of said convolutions of transfer material.

25. A carbon holder for use with continuous form stationery, comprising a base member having a provision for holding a plurality of carbon holder frames, a plurality of carbon holder frames supportable on said provision in cantilever fashion and in vertically spaced stacked relation, said provision including an upwardly extending post having a plurality of spacer members mounted thereon, said frames being pivotally mountable on said post between associated pairs of said members, respectively, and a clamping device for interclamping said frames and spacer members whereby to provide for the firm support of said frames on said base, said post having an end portion adapted for the reception of said clamping device.

References Cited in the file of this patent

UNITED STATES PATENTS

| 2,236,155 | Petit | Mar. 25, 1941 |
| 2,363,661 | Feitl | Nov. 28, 1944 |
| 2,623,623 | Johnson | Dec. 30, 1952 |